Feb. 26, 1924.
A. G. RONNING ET AL
1,485,201
ENSILAGE HARVESTER ATTACHMENT
Original Filed March 6, 1916   3 Sheets-Sheet 3
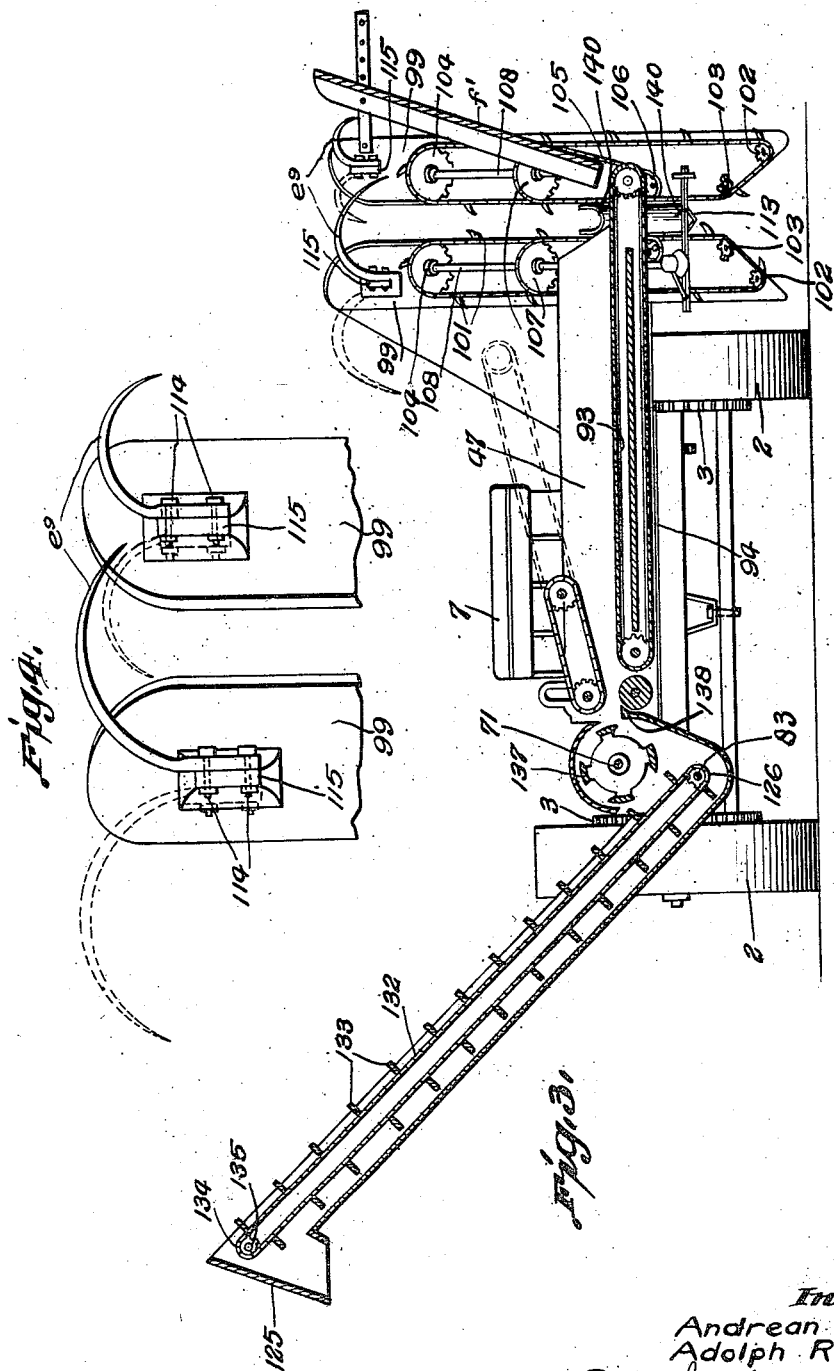
Inventors:
Andrean G. Ronning.
Adolph Ronning.
By Whiteley and Ruckman
Attorneys Patented Feb. 26, 1924.

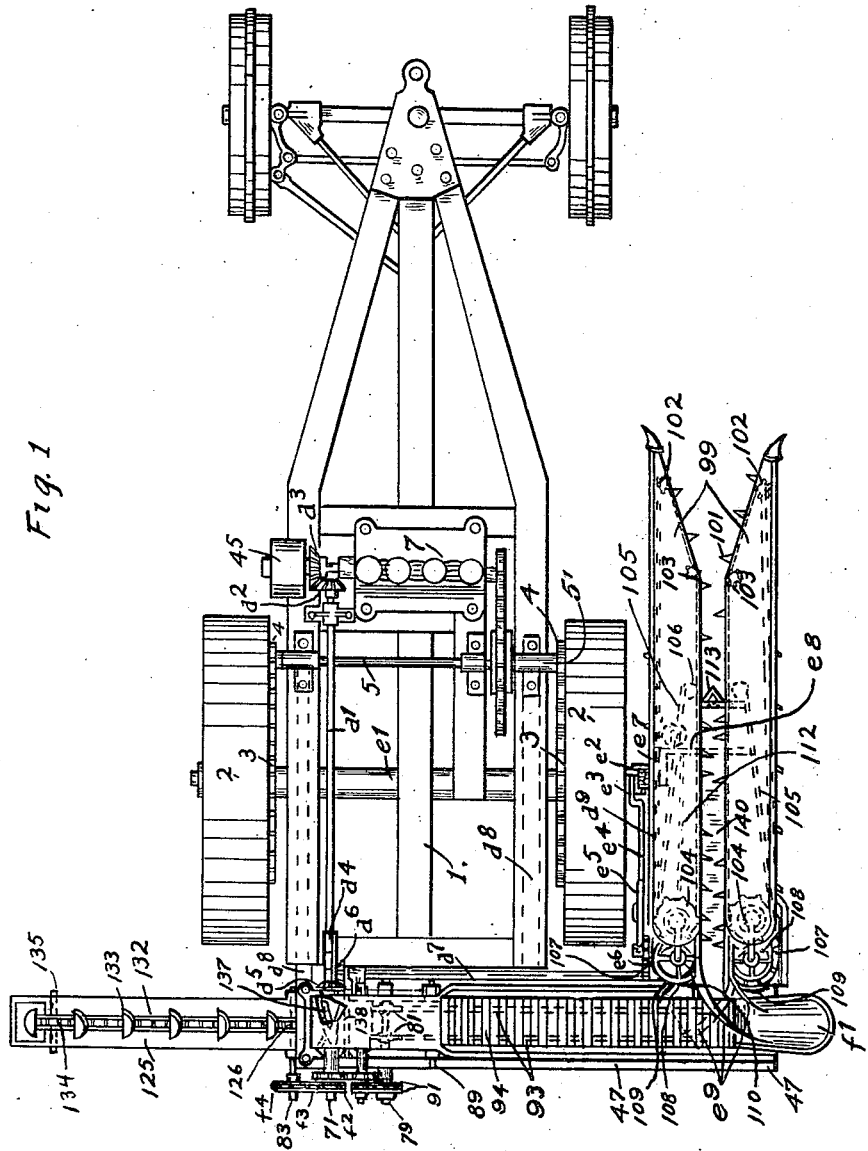

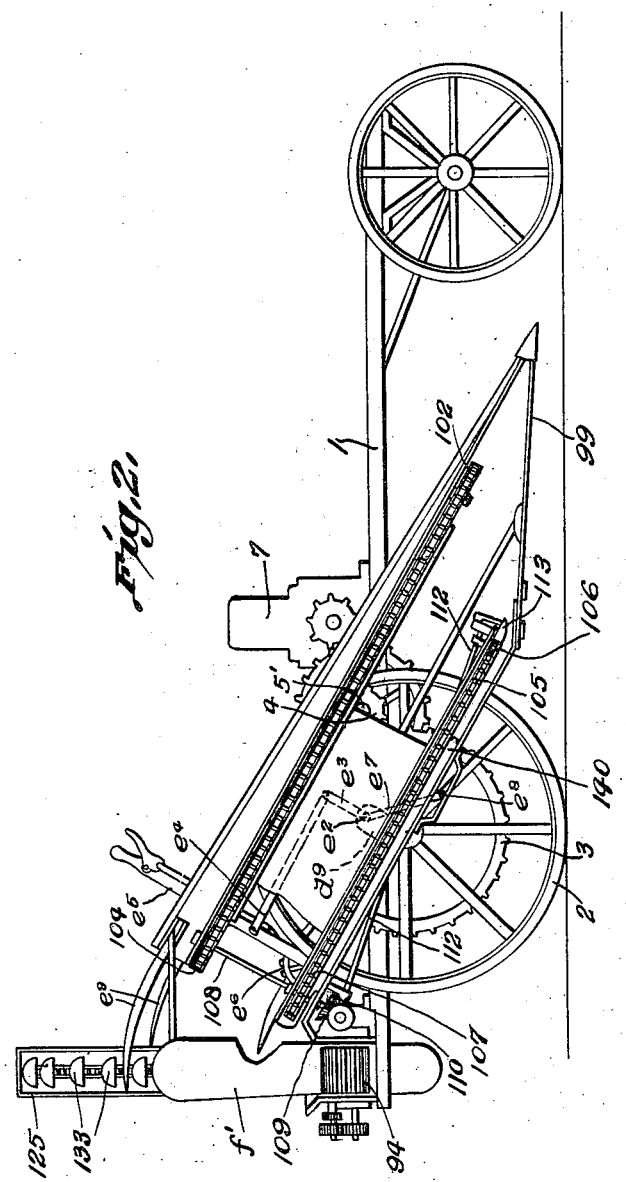

1,485,201

UNITED STATES PATENT OFFICE.

ANDREAN G. RONNING AND ADOLPH RONNING, OF MINNEAPOLIS, MINNESOTA.

ENSILAGE-HARVESTER ATTACHMENT.

Original application filed March 6, 1916, Serial No. 82,516. Divided and this application filed June 30, 1919. Serial No. 307,734.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Ensilage-Harvester Attachments, of which the following is a specification.

Our invention relates to ensilage harvester attachments and an object is to provide an attachment of this character which can be readily attached to various types of tractors which may or may not be specially designed for ensilage harvester work. This application is a division of our prior application Serial Number 82,516, filed March 6, 1916, which subsequently to the filing of the present application matured into Patent Number 1,340,461, dated May 18, 1920.

The full objects and advantages of our invention will appear in connection with the detailed description thereof and the novel features embodied in our inventive idea will be particularly pointed out in the claims.

In the accompanying drawings, Fig. 1 is a top plan view. Fig. 2 is a side view. Fig. 3 is a view in vertical section transversely through the rear portion of the machine. Fig. 4 is an enlarged detail view showing the curved deflecting arms, and means for securing the same.

The main frame 1 of the tractor is carried by and substantially balanced on drive wheels 2 which carry at their inner sides spur gears 3 meshing with spur gears 4, the latter being secured to the free outer ends of differential shafts 5 and 5' connected to the engine 7 by customary differential and clutch mechanism. The engine shown for illustrative purposes is a four-cylinder engine and the power to the ensilage harvester attachment is transmitted by means of a shaft $d'$ suitably journaled in the tractor frame and provided with a beveled gear $d^2$ meshing with a beveled gear $d^3$ secured to the engine shaft, which has a belt pulley 45 on the outer end thereof. The shaft $d'$ may be connected up with the ensilage cutter cylinder shaft 71 by any well-known coupling device $d^4$. A beveled gear $d^5$ on the shaft meshes with a beveled gear $d^6$ mounted on a transverse countershaft $d^7$ which is suitably journaled in the ensilage harvester frame 47. This frame is attached to the tractor frame 1 by brackets $d^8$ suitably connected to the rear of the tractor frame. The gathering frames 99 are pivotally attached to the side of the frame 47 in customary manner so as to allow the frames 99 and attached casting 98 freedom for pivotal adjustments. A shaft $e^2$ is suitably journaled on brackets $d^9$ and carries on its inner end an upwardly-extending arm $e^3$ pivotally connected at its upper end to a guide rod $e^4$ which is pivotally attached at its rear end to a vertically-extending lever arm $e^5$ which is pivotally mounted at its lower end upon a quadrant $e^6$. The lever arm $e^5$ is provided with the usual mechanism to engage the teeth of the quadrant $e^6$ so that it may be secured in any set adjustment. The shaft $e^2$ is provided at its outer end with a forwardly and downwardly inclined crank arm $e^7$ which is rigidly secured at its lower end to a pin $e^8$ at right angles thereto. The pin $e^8$ is suitably mounted in the gathering frames 99 with freedom to slide forwardly and rearwardly therein when tilted by means of the lever mechanism just described. Guide fingers $e^9$ are suitably attached to the upper portion of the gathering frames 99 and these fingers are curved so as to direct the corn stalks into the hopper $f'$. As shown in Figs. 3 and 4, the guide fingers or deflecting arms $e^9$ may be secured by bolts 114 to lugs 115 on the rear ends of the gathering frames 99 so that these fingers or arms may be readily secured in position extending either toward the right or left as desired. The gathering frames 99 are spaced from each other and are rigidly connected by bolts or in any suitable manner to the harvesting frame, and the top boards or plates of these frames incline downwardly toward the front while their front inner edges diverge so as to guide the standing stalks into the channel between the two frames. The movement of the corn stalks is insured by endless conveyers in the form of relatively long upper sprocket chains provided with projecting teeth 101 and supported to run over sprocket wheels 102, 103 and 104 mounted in the gathering frames. Relatively short lower sprocket chains 105 are supported to run over sprocket wheels 106 and 107 also mounted on the gathering frames. The sprocket wheels 102, 103 and 106 are idlers, while the sprocket wheels 104 and 107 are driving wheels which are secured to oblique shafts 108 suitably journaled in the frames 99 and the casting 98, and these shafts are provided at their lower ends with beveled gears 109 meshing with beveled gears 110 which are connected with a shaft 112 carrying at its forward end customary means for reciprocating a sickle 113 mounted in suitable guides in the frames. Immediately back of the sickle is a U-shaped chute 140 arranged to receive the stalks from the sickle and deliver them at its rear end to feed apron 93 provided with slats 94. If the guide fingers $c^9$ are turned to extend as shown in full lines the stalks will be deposited upon the feed apron butt ends toward the cutter and in horizontal position, and if the fingers are turned in the opposite direction, as indicated in dotted lines, the stalks will tip in the opposite direction and be deposited on the feed apron top ends toward the cutter and in horizontal position. The stalks are cut by the cylinder knives 137 operating in connection with the ledger plate 138. The cylinder shaft 71 carries a sprocket wheel $f^2$ over which runs a sprocket chain $f^3$, the outer loop of which runs over a sprocket wheel $f^4$ which is secured to a shaft 83 mounted upon which is a sprocket wheel 126 over which runs a sprocket chain 132 provided with elevator buckets 133, the outer end of the chain running over a sprocket wheel 134 secured to a shaft 135 journaled in the outer end of an elevator frame 125. This type of ensilage harvester attachment may be applied to various forms of tractors and the four-wheel type has been chosen for illustrative purposes only.

We claim:

1. A harvester comprising a stalk cutter, an ensilage cutter, means for turning the severed stalks into substantially horizontal position, means for adjusting said turning means to tip the stalks in opposite directions as desired, and means for feeding the stalks to said ensilage cutter either butt ends first or top ends first according to adjustment of said turning means.

2. A harvester comprising a stalk cutter, an ensilage cutter, means for turning the severed stalks into substantialy horizontal position, means for adjusting said turning means to tip the stalks in opposite directions as desired, means for feeding the stalks to said ensilage cutter, either butt ends first or top ends first according to adjustment of said turning means, and an engine on said harvester having connections for driving said stalk cutter and said ensilage cutter.

3. A harvester comprising a stalk cutter at the side of the harvester, an ensilage cutter at rear of the harvester, means for turning the severed stalks into substantially horizontal position, means for adjusting said turning means to tip the stalks in opposite directions as desired, and means for feeding the stalks to said ensilage cutter either butt ends first or top ends first according to the adjustment of said turning means.

4. A harvester comprising a stalk cutter at the side of the harvester, a hopper at the rear of said stalk cutter, deflecting arms for directing the severed stalks into said hopper, an ensilage cutter at the rear of the harvester, a feeding device for delivering the stalks to said ensilage cutter, and means for adjusting said deflecting arms to deposit the stalks in opposite directions, as desired, upon said feeding device.

5. A harvester comprising a stalk cutter at the side of the harvester, a hopper at the rear of said cutter, deflecting arms for directing the severed stalks into said hopper, an ensilage cutter at the rear of the harvester, a feeding device for delivering the stalks to said ensilage cutter, means for adjusting said deflecting arms to deposit the stalks in opposite directions, as desired, upon said feeding device, and toothed endless carriers for directing the stalks to said stalk cutter and cooperating with said deflecting arms to direct the severed stalks into the said hopper.

6. A harvester comprising a stalk cutter, an ensilage cutter consisting of rotary cutting knives and a cooperating ledger plate, means for turning the severed stalks into substantially horizontal position, and means for feeding the stalks top ends first to said ensilage cutter for cutting them into small pieces.

In testimony whereof we hereunto affix our signatures.

ANDREAN G. RONNING.
ADOLPH RONNING.